(12) United States Patent
Dufour et al.

(10) Patent No.: US 9,682,755 B2
(45) Date of Patent: *Jun. 20, 2017

(54) UNDERWATER VEHICLES CONFIGURED TO PERFORM VERTICAL PROFILING AND DIAGONAL PROFILING, AND CORRESPONDING METHODS OF OPERATION

(71) Applicant: MRV SYSTEMS, LLC., San Diego, CA (US)

(72) Inventors: James Edward Dufour, Solana Beach, CA (US); Brian Kenneth Newville, San Diego, CA (US)

(73) Assignee: MRV Systems, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,919

(22) Filed: Oct. 13, 2016

(65) Prior Publication Data
US 2017/0029082 A1 Feb. 2, 2017

Related U.S. Application Data

(63) Continuation of application No. 14/248,252, filed on Apr. 8, 2014, now Pat. No. 9,487,282.

(51) Int. Cl.
*B63G 8/18* (2006.01)
*B63C 11/42* (2006.01)
(Continued)

(52) U.S. Cl.
CPC ............... *B63G 8/18* (2013.01); *B63C 11/42* (2013.01); *B63G 8/001* (2013.01); *G05D 1/0692* (2013.01); *G05D 1/0875* (2013.01); *B63B 2207/02* (2013.01); *B63B 2211/02* (2013.01); *B63G 2008/002* (2013.01)

(58) Field of Classification Search
CPC ........................................................ B63G 8/14
See application file for complete search history.

(56) References Cited

U.S. PATENT DOCUMENTS 310,342 A 1/1885 Walker
718,450 A 1/1903 Gillette
(Continued)

OTHER PUBLICATIONS

Schofield, Oscar, The Robot Ocean Network, American Scientist, Nov.-Dec. 2013, pp. 434-441.

*Primary Examiner* — Edwin Swinehart
(74) *Attorney, Agent, or Firm* — Sheppard Mullin Richter & Hampton LLP

(57) ABSTRACT

An underwater vehicle may be configured to perform vertical profiling and diagonal profiling. The vehicle may include a body having an elongated shape with a central longitudinal axis orthogonal to a central lateral axis. The vehicle may include lateral control surfaces. The lateral control surfaces may be disposed outside of the body and mechanically coupled with the body at a position proximal to the central lateral axis. The lateral control surfaces may be configured to rotate about a control axis parallel to the central lateral axis in order to control an attitude of the vehicle during ascent or descent. A given one of the lateral control surfaces may have a portion extend from the mechanical coupling in a direction perpendicular to the control axis.

19 Claims, 17 Drawing Sheets

(51) Int. Cl.
*G05D 1/06* (2006.01)
*G05D 1/08* (2006.01)
*B63G 8/00* (2006.01)

(56) References Cited

U.S. PATENT DOCUMENTS

| | | | |
|---|---|---|---|
| 3,047,259 A | 7/1962 | Tatnall | |
| 3,115,831 A | 12/1963 | Henry | |
| 3,134,351 A * | 5/1964 | Ely, Jr. | B63G 8/18 |
| | | | 114/332 |
| 3,157,145 A | 11/1964 | Farris | |
| 3,290,642 A | 12/1966 | Mason | |
| 3,329,119 A | 7/1967 | Fritzsche | |
| 3,946,685 A | 3/1976 | Chadbourne | |
| 4,007,505 A | 2/1977 | Nowatzki | |
| 4,204,806 A | 5/1980 | Blanchard | |
| 4,954,110 A | 9/1990 | Warnan | |
| 5,121,702 A * | 6/1992 | Johnson | B63G 8/18 |
| | | | 114/330 |
| 5,235,930 A | 8/1993 | Pendleton | |
| 5,551,363 A | 9/1996 | Cipolla | |
| 5,602,801 A | 2/1997 | Nussbaum | |
| 6,786,087 B2 | 9/2004 | Desa | |
| 7,131,389 B1 | 11/2006 | Hawkes | |
| 7,610,871 B2 | 11/2009 | Leclercq | |
| 7,752,988 B2 | 7/2010 | Axford | |
| 8,127,704 B2 | 3/2012 | Vosburgh | |
| 8,205,570 B1 | 6/2012 | Tureaud | |
| 8,265,809 B2 | 9/2012 | Webb | |
| 8,397,657 B2 | 3/2013 | Guerrero | |
| 8,418,642 B2 * | 4/2013 | Vosburgh | B63G 8/001 |
| | | | 114/312 |
| 8,499,708 B2 | 8/2013 | Roodenburg | |
| 9,381,987 B1 | 7/2016 | Dufour | |
| 9,487,282 B2 * | 11/2016 | Dufour | B63G 8/18 |
| 2007/0125289 A1 | 6/2007 | Asfar | |

* cited by examiner

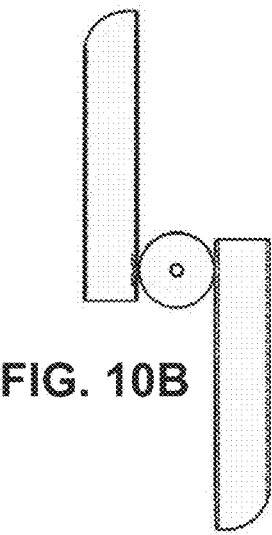
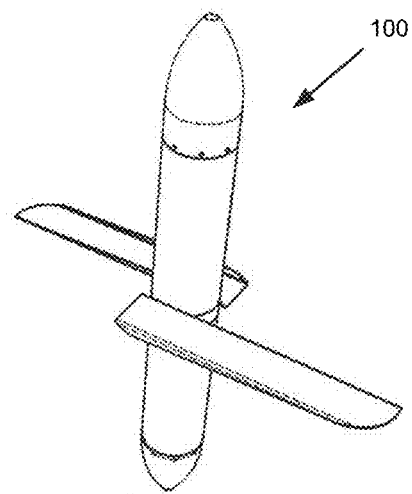
FIG. 10B
FIG. 10A
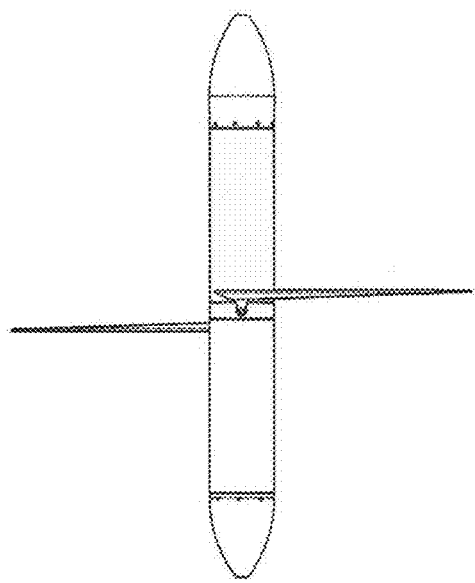
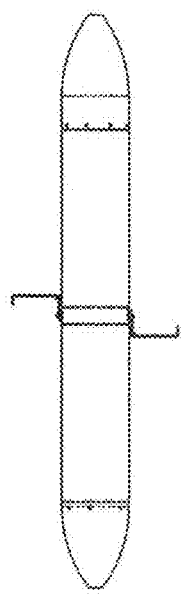
FIG. 10C
FIG. 10D

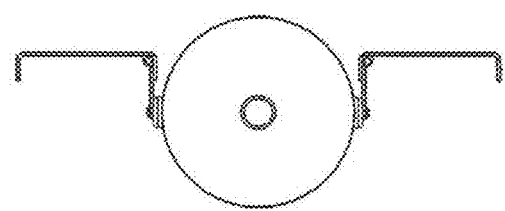
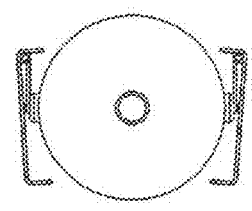
FIG. 11A  FIG. 11B
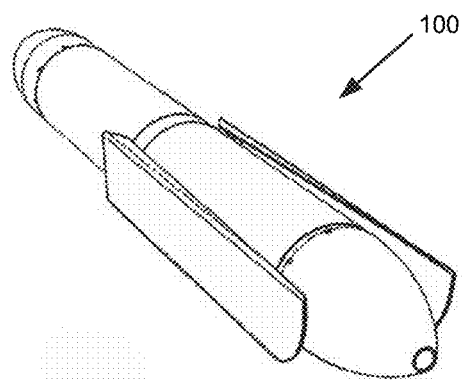
FIG. 11C

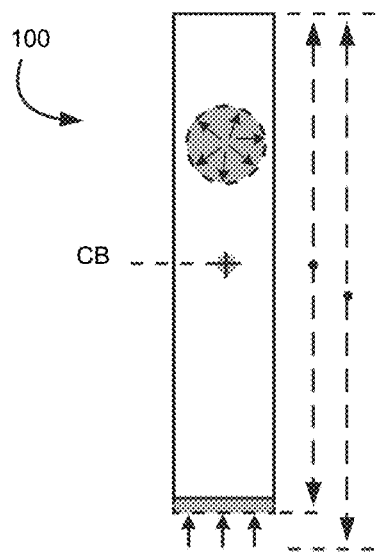
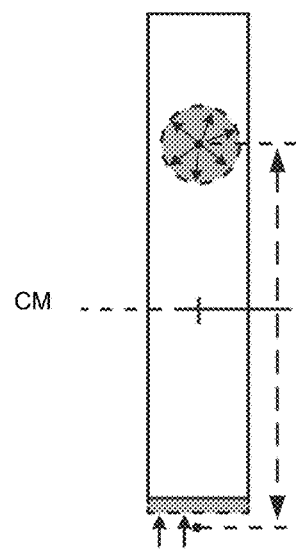
FIG. 14A    FIG. 14B
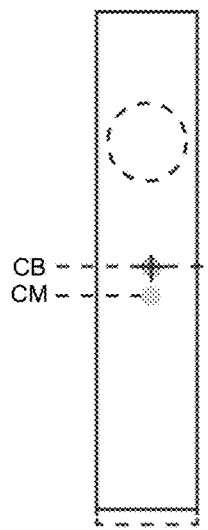
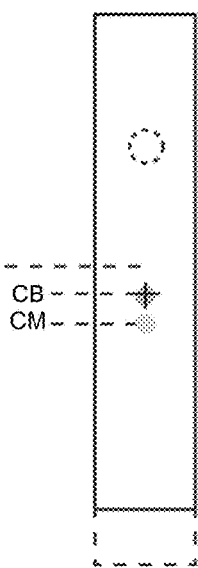
FIG. 14C    FIG. 14D

UNDERWATER VEHICLES CONFIGURED TO PERFORM VERTICAL PROFILING AND DIAGONAL PROFILING, AND CORRESPONDING METHODS OF OPERATION

FIELD OF THE DISCLOSURE

This disclosure relates to underwater vehicles configured to perform vertical profiling and diagonal profiling, and corresponding methods of operation

BACKGROUND

A conventional profiling float is an oceanographic instrument platform that changes its buoyancy in order to move vertically in the ocean, repeatedly collecting data that spans a range of depths ("profiles"). Horizontal motion is dictated by ocean currents. Common sensors include temperature, conductivity, and pressure (from which salinity can be calculated), though a wide range of other sensors have been deployed on floats. Often, floats may be treated as disposable, as the expense of recovering them from remote areas of the ocean is prohibitive; in other cases, floats may be deployed for a short time and recovered. A major user of profiling floats is the Argo program.

SUMMARY

Exemplary implementations may provide an underwater vehicle configured to perform vertical profiling and diagonal profiling by using two movable wing-like lateral control surfaces. According to some implementations, the vehicle may be configured to: (1) turn to a desired heading within a few vertical meters of movement, (2) keep station in ocean currents, (3) provide vertical measurement profiles within the mixed layer, (4) provide a simplified design for significantly decreased manufacturing costs, (5) provide a simplified buoyancy and attitude control for significantly decreased power requirements, and/or provide other features. The vehicle may be configured to provide conventional vertical profiles rather than the mixed horizontal-vertical sampling provided by a glider. Some implementations may include a hydraulic buoyancy engine providing comparable performance to larger systems used in gliders and Argo floats. According to some implementations, the vehicle may be configured to initially rotate rather than turn to orient in an intended direction of flight. As such, the vehicle may be configured to turn towards a waypoint while leaving the surface much more quickly and over a small vertical distance than a conventional glider. The vehicle may include a variety of sensors that measure the upper ocean in a profile mode with directional capabilities. In contrast, conventional profiling floats profile vertically but drift at the mercy of currents, wind, and/or other forces. Conventional gliders do not provide a vertical profile because gliders display too much horizontal displacement to perform vertical profiles.

One aspect of the disclosure relates to an underwater vehicle configured to perform vertical profiling and diagonal profiling. The vehicle may include a body having an elongated shape with a central longitudinal axis orthogonal to a central lateral axis. The body may have an upper end on the central longitudinal axis and a lower end on the central longitudinal axis. The vehicle may include lateral control surfaces including a first control surface and a second control surface. The lateral control surfaces may be disposed outside of the body and mechanically coupled with the body at a position proximal to the central lateral axis. The lateral control surfaces may be configured to rotate about a control axis parallel to the central lateral axis in order to control an attitude of the vehicle during ascent or descent. The attitude may be an inclination of one or both of the central longitudinal axis or the central lateral axis relative to one or more positional references. A given one of the lateral control surfaces may have a portion extend from the mechanical coupling in a direction perpendicular to the control axis.

Another aspect of the disclosure relates to a method for operating an underwater vehicle configured to perform vertical profiling and diagonal profiling. The method may include rotating lateral control surfaces downward. The lateral control surfaces may be disposed outside of a body of the vehicle having an elongated shape with a central longitudinal axis orthogonal to a central lateral axis. The lateral control surfaces may be mechanically coupled with the body at a position proximal to the central lateral axis. The lateral control surfaces may be configured to rotate about a control axis parallel to the central lateral axis in order to control an attitude of the vehicle during ascent or descent. The attitude may be an inclination of one or both of the central longitudinal axis or the central lateral axis relative to one or more positional references. A given one of the lateral control surfaces may have a portion extend from the mechanical coupling in a direction perpendicular to the control axis. The method may include decreasing a buoyancy of the vehicle to cause the vehicle to descend. The method may include canting the lateral control surfaces slightly from vertical and away from the central longitudinal axis such that the vehicle rotates until it reaches a desired glide angle. The method may include responsive to reaching the desired glide angle, rotating the lateral control surfaces to be approximately parallel to the central longitudinal axis of the vehicle.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 10A, 10B, 10C, and 10D illustrate various views of the vehicle in a surface configuration, in accordance with one or more implementations.

FIGS. 11A, 11B, and 11C illustrate various views of the vehicle in a folded or unfolded configuration, in accordance with one or more implementations.

FIGS. 14A, 14B, 14C, and 14D illustrate various spatial relationships between a center of mass of the vehicle and a center of buoyancy of the vehicle, in accordance with one or more implementations.

DETAILED DESCRIPTION

Figure 1:
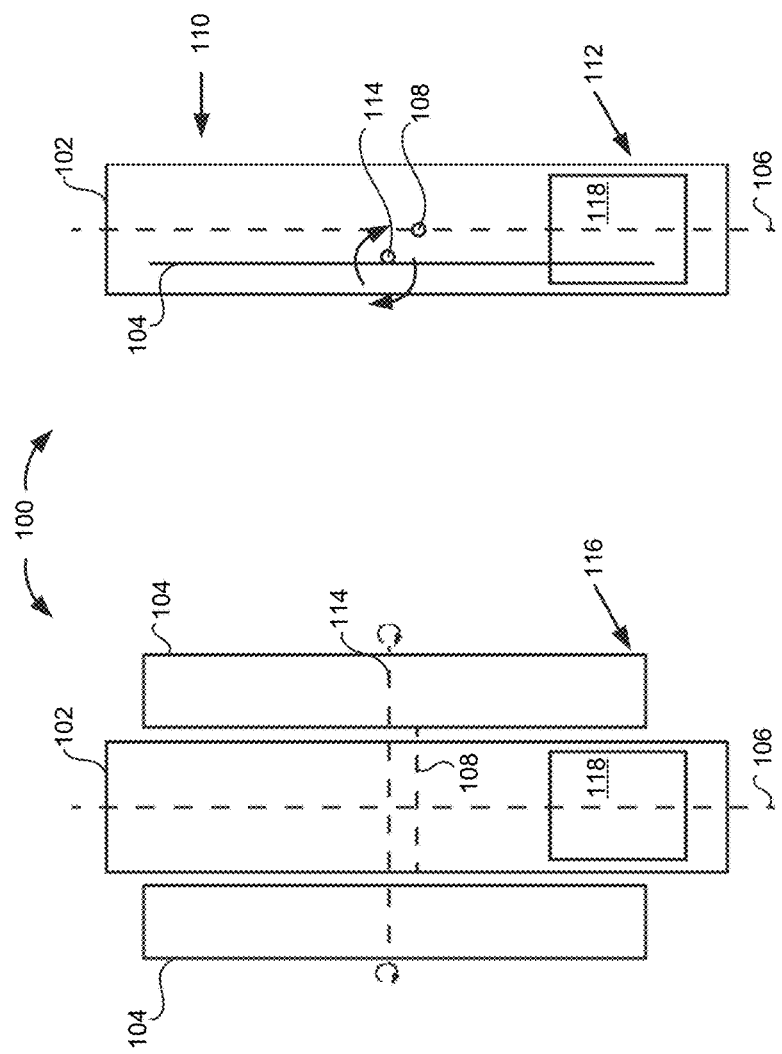
FIGS. 1A and 1B respectively illustrate a front view and a side view of an underwater vehicle configured to perform vertical profiling and diagonal profiling, in accordance with one or more implementations.

FIGS. 1A and 1B respectively illustrate a front view and a side view of an underwater vehicle 100 configured to perform vertical profiling and diagonal profiling, in accordance with one or more implementations. In some implementations, vehicle 100 may include one or more of a body 102, lateral control surfaces 104, and/or other components.

The body 102 may have an elongated shape with a central longitudinal axis 106 orthogonal to a central lateral axis 108. In some implementations, body 102 may be substantially shaped as a cylinder. The body 102 may have an upper end 110 on and a lower end 112. The lower end 112 may be positioned below upper end 110 regardless of whether vehicle 100 is descending or ascending. One or both of upper end 110 or lower end 112 of body 102 may be shaped for hydrodynamic efficiency (e.g., conical, tapered, and/or other hydrodynamic shapes). The body 102 may be configured to withstand pressures associated with various water depths of 1000. The lateral control surfaces 104 may be disposed outside of body 102. In some implementations, body 102 may be configured to withstand pressures associated with water depths of 1000 or more meters.

The lateral control surfaces 104 may be disposed outside of body 102. The lateral control surfaces 104 may be mechanically coupled with body 102 at a position proximal to central lateral axis 108. The lateral control surfaces 104 may be configured to rotate about a control axis 114 parallel to central lateral axis 108 in order to control an attitude of vehicle 100 during ascent or descent. In some implementations, lateral control surfaces 104 may be offset from central lateral axis 108 but attached to and rotate about central lateral axis 108, bisecting central longitudinal axis 106. Attitude may describe an inclination of one or both of central longitudinal axis 106 or central lateral axis 108 relative to one or more positional references. Examples of such positional references may include one or more of a surface of a body of water, a vertical line normal to a surface of a body of water, the four cardinal directions, a direction of a current in a body of water, and/or other positional references. A first control surface 104 and a second control surface 104 may be configured to rotate independently from each other about control axis 114.

A given lateral control surface 104 may have a portion 116 extending from the mechanical coupling in a direction perpendicular to control axis 114. A given lateral control surface 104 may be longer in a direction perpendicular to control axis 114 relative to in a direction parallel to control axis 114. A given lateral control surface 114 may be asymmetric about control axis 114. In some implementations, an arm (not depicted) extending from control axis 114 may connect the mechanical coupling with a given lateral control surface 104. A given lateral control surface 104 may be tapered at one or both ends to avoid fouling of seaweed and other floating debris. A size and/or shape of a given lateral control surface 104 may be selected based on one or more considerations including desired performance characteristics (e.g., depth of operation, aspect ratio of diagonal movements, and/or other performance characteristics), environmental conditions (e.g., currents and/or other conditions), presence of one or more external sensors (not depicted) that may interrupt flow during descent or ascent, and/or other considerations. A given lateral control surface 104 may be configured to rotate at least 180 degrees about control axis 114.

In some implementations, a given lateral control surface 104 may be offset with respect to central longitudinal axis 106. This may facilitate self-leveling by creating a keel of sorts for stabilization. Such a "high wing" design may allow vehicle 100 to maintain roll orientation and stability about central longitudinal axis 106. The control axis 114 may coincide with the mechanical coupling. The control axis 114 may be non-coplanar with central longitudinal axis 106 and is disposed away from central longitudinal axis 106. The control axis 114 may intersect central longitudinal axis 106, in some implementations. The lateral control surfaces 104 may be disposed away from control axis 114. According to some implementations, lateral control surfaces 104 may mechanically couple to body 102 by way of a servo motor.

Figure 2:
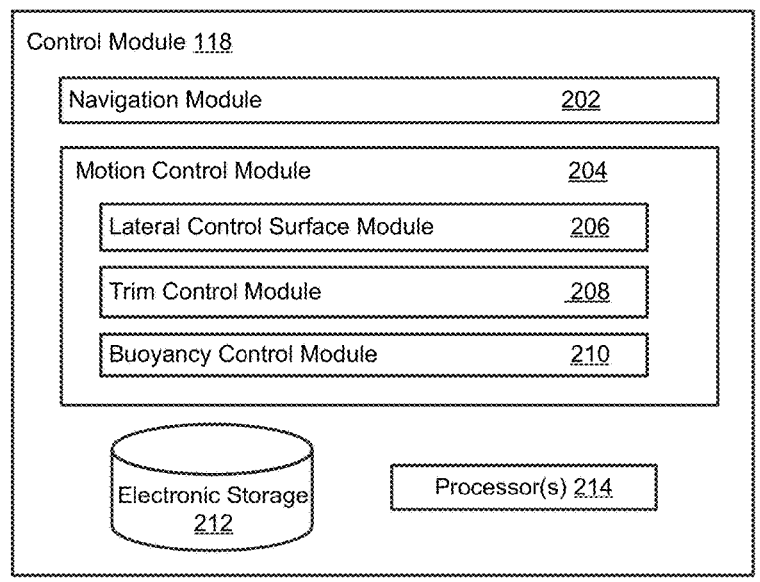
FIG. 2 illustrates a control module disposed within the vehicle, in accordance with one or more implementations.
Figure 3B:
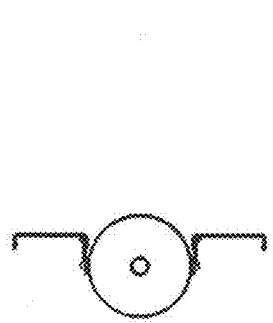
FIGS. 3A, 3B, 3C, 3D, and 3E illustrate various views of the vehicle in a glide angle descent configuration, in accordance with one or more implementations.
Figure 3A:
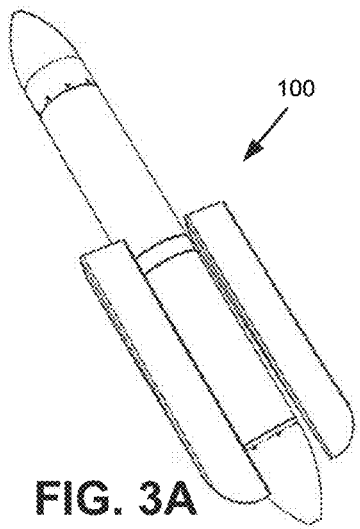
Figure 3C:
Figure 3D:
Figure 3E:
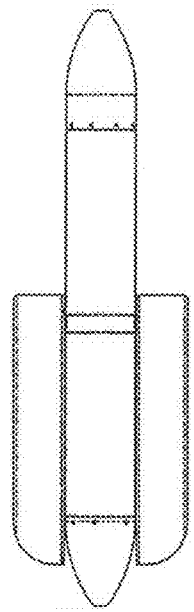
Figure 4B:
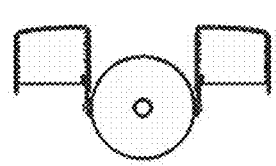
FIGS. 4A, 4B, 4C, 4D, and 4E illustrate various views of the vehicle in a transitional descent configuration, in accordance with one or more implementations.
Figure 4A:
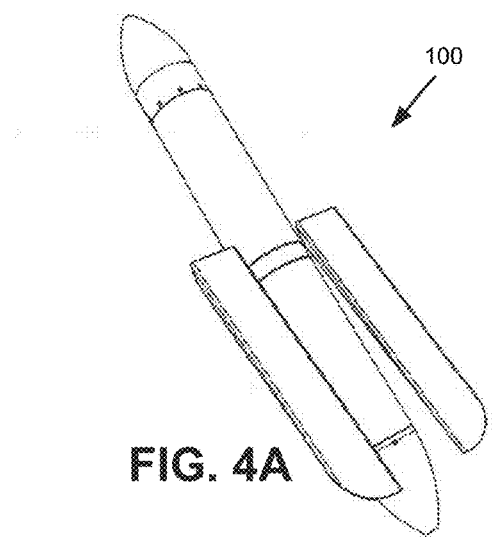
Figure 4C:
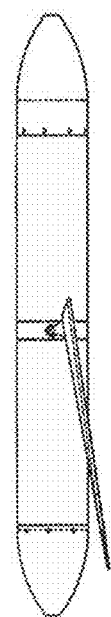
Figure 4D:
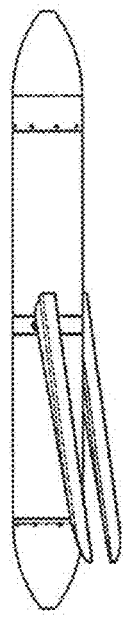
Figure 4E:
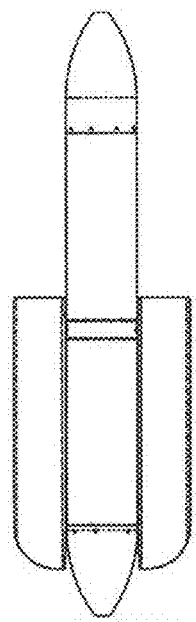
Figure 5B:
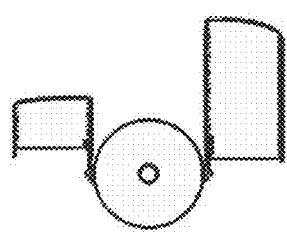
FIGS. 5A, 5B, 5C, and 5D illustrate various views of the vehicle in a turning descent configuration, in accordance with one or more implementations.
Figure 5A:
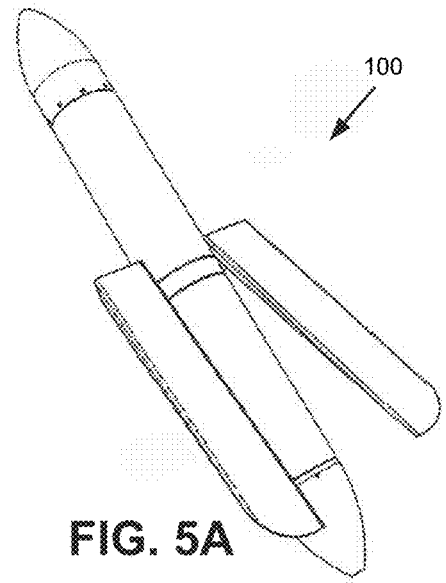
Figure 5C:
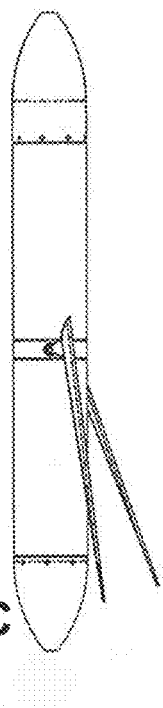
Figure 5D:
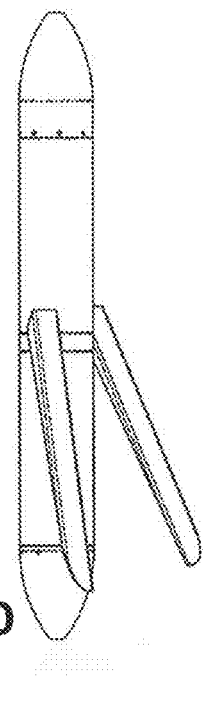
Figure 6A:
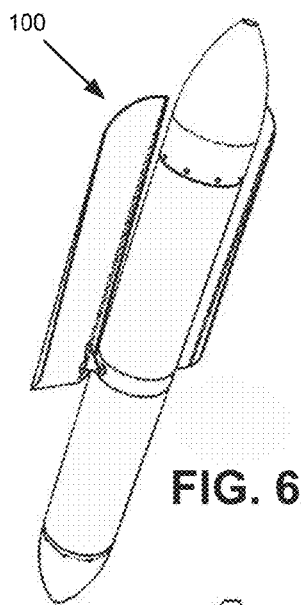
FIGS. 6A, 6B, 6C, 6D, and 6E illustrate various views of the vehicle in a glide angle ascent configuration, in accordance with one or more implementations.
Figure 6B:
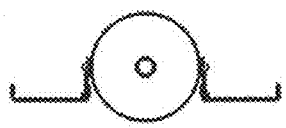
Figure 6C:
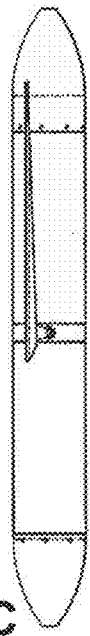
Figure 6D:
Figure 6E:
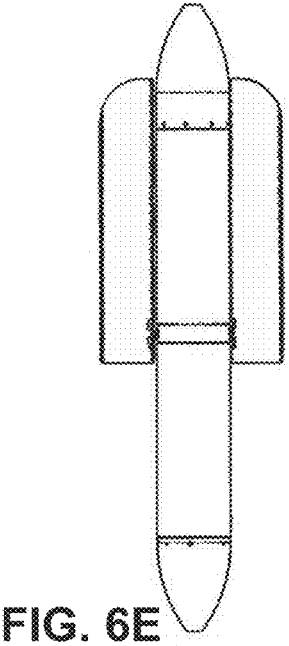
Figure 7A:
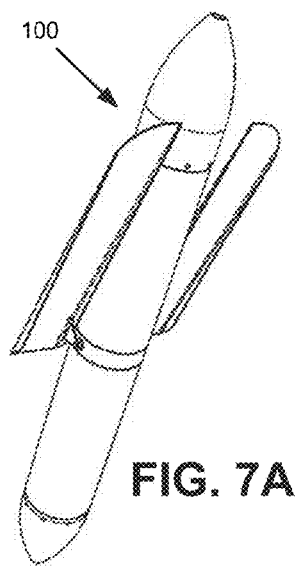
FIGS. 7A, 7B, 7C, 7D, and 7E illustrate various views of the vehicle in a transitional ascent configuration, in accordance with one or more implementations.
Figure 7B:
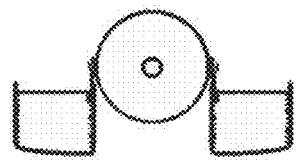
Figure 7C:
Figure 7D:
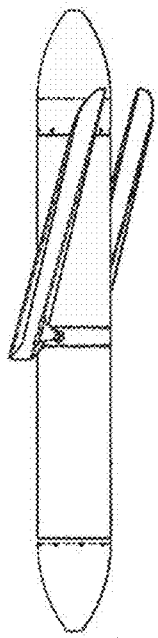
Figure 7E:
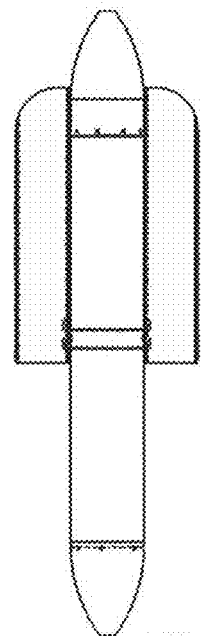

The vehicle 100 may include a control module 106. FIG. 2 illustrates control module 106, in accordance with one or more implementations. The control module 106 may include a navigation module 202, a motion control module 204, and/or other components.

The navigation module 202 may be configured to provide navigational information associated with one or more of an attitude of the vehicle, a position of the vehicle relative to one or more positional references, a direction of locomotion of the vehicle (e.g., a heading, a waypoint, a spatial operational zone, and/or other descriptions of direction), and/or other information. The navigation module 202 may be configured to interpret a direction and/or an angle of descent or ascent during a profile phase. The navigation module 202 may be configured to verify maximum operating depth, time, pressure, rates of ascent and descent, wave spectra, angular orientation of vehicle 100 during ascent and descent, and/or other parameters. The navigational information provided by navigation module 202 may be conveyed to motion control module 204. Some implementations may include a feedback mechanism where the navigational information streams to motion control module 204. In some implementations, navigation module 202 may include one or more of an accelerometer (e.g., a 3-axis accelerometer, a 9-axis accelerometer, and/or other types of accelerometers), a gyroscope, a compass, a global positioning system receiver, a pressure sensor (e.g., barometric pressure sensor), and/or other sensors or devices.

The motion control module 204 may be configured to control motions of vehicle 100. The motions of vehicle 100 may include one or more of an attitude of vehicle 100, locomotion of vehicle 100 relative to one or more positional references, a direction of locomotion of vehicle 100, and/or other motions. The motion control module 204 may be configured to control attitude, rate of descent or scent, and/or other factors to optimize maximum horizontal range. The motion control module 204 may include a lateral control surface module 206, a trim control module 208, a buoyancy control module 210, and/or other components.

The lateral control surface module 206 may be configured to separately or simultaneously control a position of lateral control surfaces 104 relative to body 102. The lateral control surface module 206 may be configured to adjust angles of lateral control surfaces 104 for optimal descent or ascent rate. The lateral control surfaces 104 may rotate approximately 180° when switching between descent and ascent. In order to profile or descend diagonally, lateral control surface module 206 may position lateral control surfaces 104 synchronously to direct vehicle 100 on an angular trajectory. The lateral control surface module 206 may be configured to control turning of vehicle 100. The lateral control surface module 206 may be configured to adjust positions of lateral control surfaces 104 based on attitude feedback from navigation module 202.

The trim control module 208 may be configured to control a position of a center of mass of vehicle 100 relative to a center of buoyancy of vehicle 100. In some implementations, a ballast weight may be disposed along central longitudinal axis 106. The center of mass may be adjusted to be slightly below the center of buoyancy, far below the center of buoyancy, and/or at other positions. The control of the center of mass may be dynamic based on attitude feedback from navigation module 202. Maintaining proper trim may optimize or improve diagonal descent or ascent. Feedback control of an asset angle may facilitate high-resolution trim adjustment allowing for optimal horizontal displacement.

In some implementations, vehicle 100 may be initially ballasted so the center of mass is below the center of buoyancy by a small amount. If the center of mass and the center of buoyancy are at the same position, vehicle 100 may exhibit random, unstable vertical behavior. The vehicle 100 may be more stable with increasing separation between the center of mass and the center of buoyancy, with the center of mass being below the center of buoyancy.

In some implementations, trim control module 206 may be configured to manage positions of the center of mass and the center of buoyancy so during descent or ascent lateral control surfaces 104 are substantially parallel to central longitudinal axis 106. An optimal glide ratio may be dependent on a relationship between a rate of descent or ascent, and a position of the center of mass and/or the center of buoyancy. Feedback control from navigation module 202 during asset descent or ascent may facilitate high-resolution trim adjustment allowing for optimal horizontal displacement. While diagonally profiling, vehicle 100 may not require great adjustability and repositioning of the center of mass. Once vehicle 100 is trimmed during assembly, the only adjustment necessary may be to compensate for an incompressible medium migrating from an internal reservoir (not depicted) to an external bladder (not depicted) while changing volume (for buoyancy control).

In some implementations, trim control module 206 may include a mass (not depicted) disposed within body 102. The mass may be configured to translate parallel to central longitudinal axis 106 to adjust the center of mass toward upper end 110 of vehicle 100 or toward lower end 112 of vehicle 100. The mass may include a solid mass. The mass may include a liquid configured to be pumped between two reservoirs (not depicted) disposed within body 102 of vehicle 100.

The buoyancy control module 210 may be configured to control vertical motion of vehicle 100 by affecting a buoyancy of vehicle 100. The buoyancy of vehicle 100 may be controlled during descent or ascent to maintain proper velocity and/or optimal horizontal displacement. In some implementations, buoyancy may be controlled by affecting the overall density of vehicle 100 relative to the density of the water in which vehicle 100 is submersed. Because density is a function of volume and mass, affecting the overall density of vehicle 100 typically may be achieved by affecting one or both of the effective volume of vehicle 100 or the effective mass of vehicle 100. Affecting the effective volume of vehicle 100 may be achieved by increasing or decreasing the volume of a flexible chamber that is external to a fixed volume body of vehicle 100. Affecting the effective mass of vehicle 100 may be achieved by using surrounding water to fill a tank disposed within vehicle 100 or draining that tank into the surrounding water. The buoyancy control module 210 may include one or more of a high-pressure hydraulic pump and valve, a low-pressure air assist pump and valve, a descent control fuse, associated low-level software, and/or other components.

The lateral control surfaces 104 may be movable into a descent configuration. The descent configuration may be characterized by the working portions (e.g., portion 116) of lateral control surfaces 104 being disposed proximal to lower end 112 of vehicle 100. The descent configuration may include one or more of a glide angle descent configuration, a transitional descent configuration, a turning descent configuration, and/or other configurations.

The control module 106 may include electronic storage 212 and one or more processors 214. Electronic storage 212 may comprise non-transitory storage media that electronically stores information. The electronic storage media of electronic storage 212 may include one or both of system storage that is provided integrally (i.e., substantially non-removable) with vehicle 100 and/or removable storage that is removably connectable to vehicle 100 via, for example, a port (e.g., a USB port, a firewire port, etc.) or a drive (e.g., a disk drive, etc.). Electronic storage 212 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 212 may include one or more virtual storage resources (e.g., cloud storage, a virtual private network, and/or other virtual storage resources). Electronic storage 212 may store software algorithms, information determined by processor(s) 214, information received by vehicle 100, information received by navigational module 202, and/or other information that enables vehicle 100 to function as described herein.

Processor(s) 214 may be configured to provide information processing capabilities in vehicle 100. For example, processor(s) 214 may control one or more components of vehicle 100. As such, processor(s) 214 may include one or more of a digital processor, an analog processor, a digital circuit designed to process information, an analog circuit designed to process information, a state machine, and/or other mechanisms for electronically processing information. Although processor(s) 214 is shown in FIG. 2 as a single entity, this is for illustrative purposes only. In some implementations, processor(s) 214 may include a plurality of processing units. These processing units may be physically located within the same device, or processor(s) 214 may represent processing functionality of a plurality of devices operating in coordination. The processor(s) 214 may be configured to execute computer program instructions. Processor(s) 214 may be configured to execute computer program instructions by software; hardware; firmware; some combination of software, hardware, and/or firmware; and/or other mechanisms for configuring processing capabilities on processor(s) 214.

FIGS. 3A, 3B, 3C, 3D, and 3E respectively illustrate an isometric view, an end-on view, a side view, a rotated view, and a front view of vehicle 100 in the glide angle descent configuration, in accordance with one or more implementations. The glide angle descent configuration may be characterized by lateral control surfaces 104 being positioned substantially parallel to central longitudinal axis 106 of body 102 of vehicle 100.

FIGS. 4A, 4B, 4C, 4D, and 4E respectively illustrate an isometric view, an end-on view, a side view, a rotated view, and a front view of vehicle 100 in the transitional descent configuration, in accordance with one or more implementations. The transitional descent configuration may be characterized by lateral control surfaces 104 being canted relative to central longitudinal axis 106 of body 102 of vehicle 100.

FIGS. 5A, 5B, 5C, and 5D respectively illustrate an isometric view, an end-on view, a side view, and a rotated view of vehicle 100 in the turning descent configuration, in accordance with one or more implementations. The turning descent configuration may be characterized by a first control surface 104 being canted differently than a second control surface 104 relative to central longitudinal axis 106 of body 102 of vehicle 100.

The lateral control surfaces 104 may be movable into an ascent configuration. The ascent configuration may be characterized by the working portions (e.g., portion 116) of lateral control surfaces 104 being disposed proximal to upper end 110 of vehicle 100. The ascent configuration may include one or more of a glide angle ascent configuration, a transitional ascent configuration, a turning ascent configuration, and/or other configurations.

FIGS. 6A, 6B, 6C, 6D, and 6E respectively illustrate an isometric view, an end-on view, a side view, a rotated view, and a front view of vehicle 100 in the glide angle ascent configuration, in accordance with one or more implementations. The glide angle ascent configuration may be characterized by lateral control surfaces 104 being positioned substantially parallel to central longitudinal axis 106 of body 102 of vehicle 100.

FIGS. 7A, 7B, 7C, 7D, and 7E respectively illustrate an isometric view, an end-on view, a side view, a rotated view, and a front view of vehicle 100 in the transitional ascent configuration, in accordance with one or more implementations. The transitional ascent configuration may be characterized by lateral control surfaces 104 being canted relative to central longitudinal axis 106 of body 102 of vehicle 100.

Figure 8A:
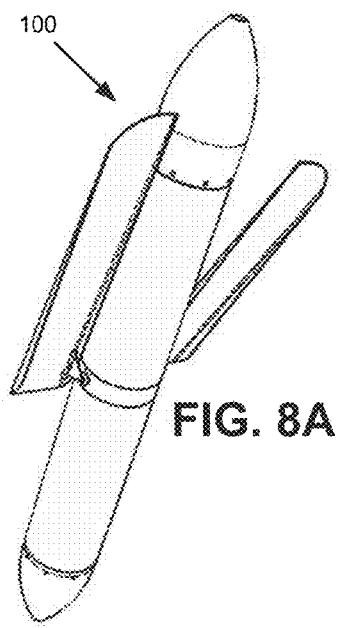
FIGS. 8A, 8B, and 8C illustrate various views of the vehicle in a turning ascent configuration, in accordance with one or more implementations.
Figure 8B:
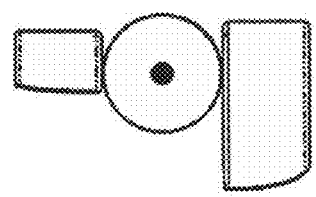
Figure 8C:
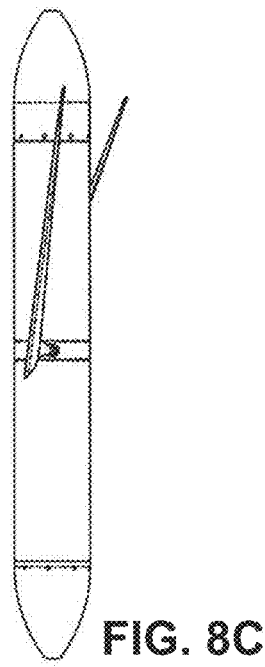

FIGS. 8A, 8B, and 8C respectively illustrate an isometric view, an end-on view, and a side view of vehicle 100 in the turning ascent configuration, in accordance with one or more implementations. The turning ascent configuration may be characterized by a first control surface 104 being canted differently than a second control surface 104 relative to 106 central longitudinal axis of body 102 of vehicle 100.

Figure 9A:
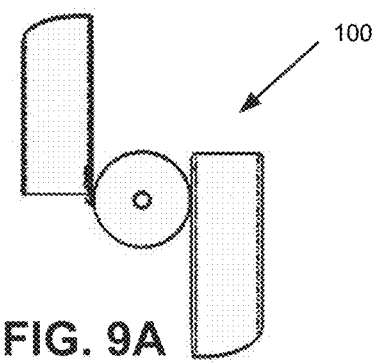
FIGS. 9A, 9B, and 9C illustrate various views of the vehicle in a spin configuration, in accordance with one or more implementations.
Figures 9B, 9C:
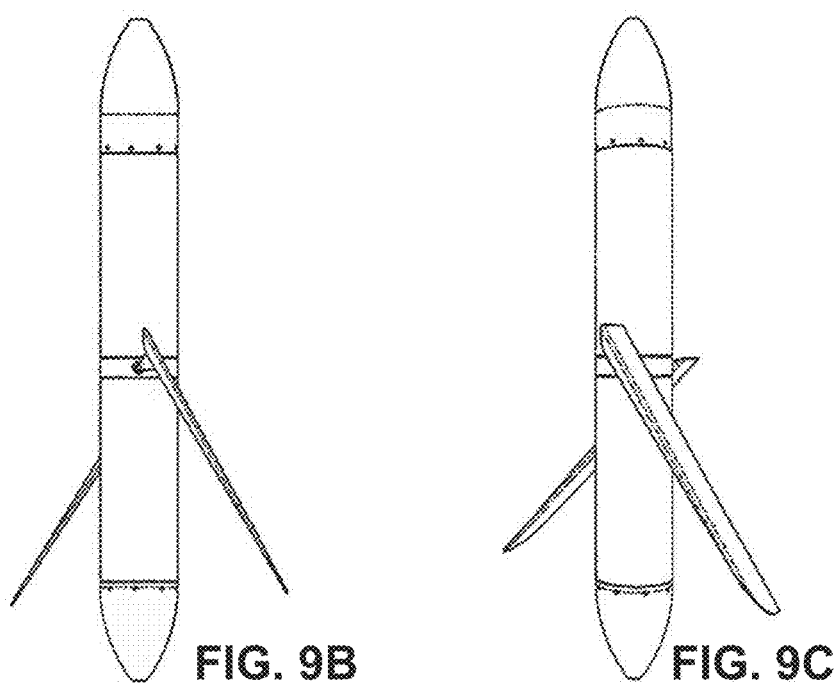

FIGS. 9A, 9B, and 9C respectively illustrate an end-on view, a side view, and a rotated view of vehicle 100 in a spin configuration, in accordance with one or more implementations. The spin configuration may be characterized by the working portions (e.g., portion 116) of lateral control surfaces 104 being disposed proximal to the same end (e.g., upper end 110 or lower end 112) of vehicle with a first control surface 104 and a second control surface 104 being canted in equal amounts but in opposite directions. The spin configuration may facilitate measuring vertical currents by spinning vehicle 100 during ascent or descent, where one revolution may be associated with a known vertical displacement. Decrease or increase of vertical currents may result in more or less spin during ascent or descent compared to still water.

FIGS. 10A, 10B, 10C, and 10D respectively illustrate an isometric view, an end-on view, a side view, and a front view of vehicle 100 in a surface configuration, in accordance with one or more implementations. The surface configuration may be characterized by lateral control surfaces 104 being disposed substantially perpendicular to central longitudinal axis 106 of body 102 of vehicle 100. The surface configuration may be characterized by lateral control surfaces 104 being disposed substantially perpendicular to central longitudinal axis 106, and in opposite directions. When floating at the sea surface, orienting lateral control surfaces 104 horizontally may reduce bobbing. In some implementations, when floating at the sea surface with an attached drag (not depicted) at a lower depth, vehicle 100 may be configured to generate electricity via flapping motion of lateral control surfaces 104.

FIGS. 11A, 11B, and 11C respectively illustrate an end-on view of an unfolded configuration, and an end-on view and an isometric view of a folded configuration, in accordance with one or more implementations. The folded configuration may be characterized by lateral control surfaces 104 being folded toward body 102 of vehicle 100. The folded configuration may facilitate tube-based deployment (e.g., from a plane)

Using one or more of the configurations described above, vehicle 100 may be configured to: (1) stay stationary by fighting currents, (2) track features including acoustic signatures, (3) radially scan an environment surrounding vehicle 100, (4) adjust descent or ascent rate by adding extra drag (e.g., moving lateral control surfaces 104 to horizontal positions), (5) seek to targets (e.g., sub-surface targets, targets on sea bottom, and/or perform other functions.

In some implementations, vehicle 100 may be operatively linked via one or more electronic communication links. For example, such electronic communication links may be established, at least in part, via a network such as a satellite network and/or other networks. It will be appreciated that this is not intended to be limiting, and that the scope of this disclosure includes implementations in which vehicle 100 may be operatively linked via some other communication media.

Figure 12:
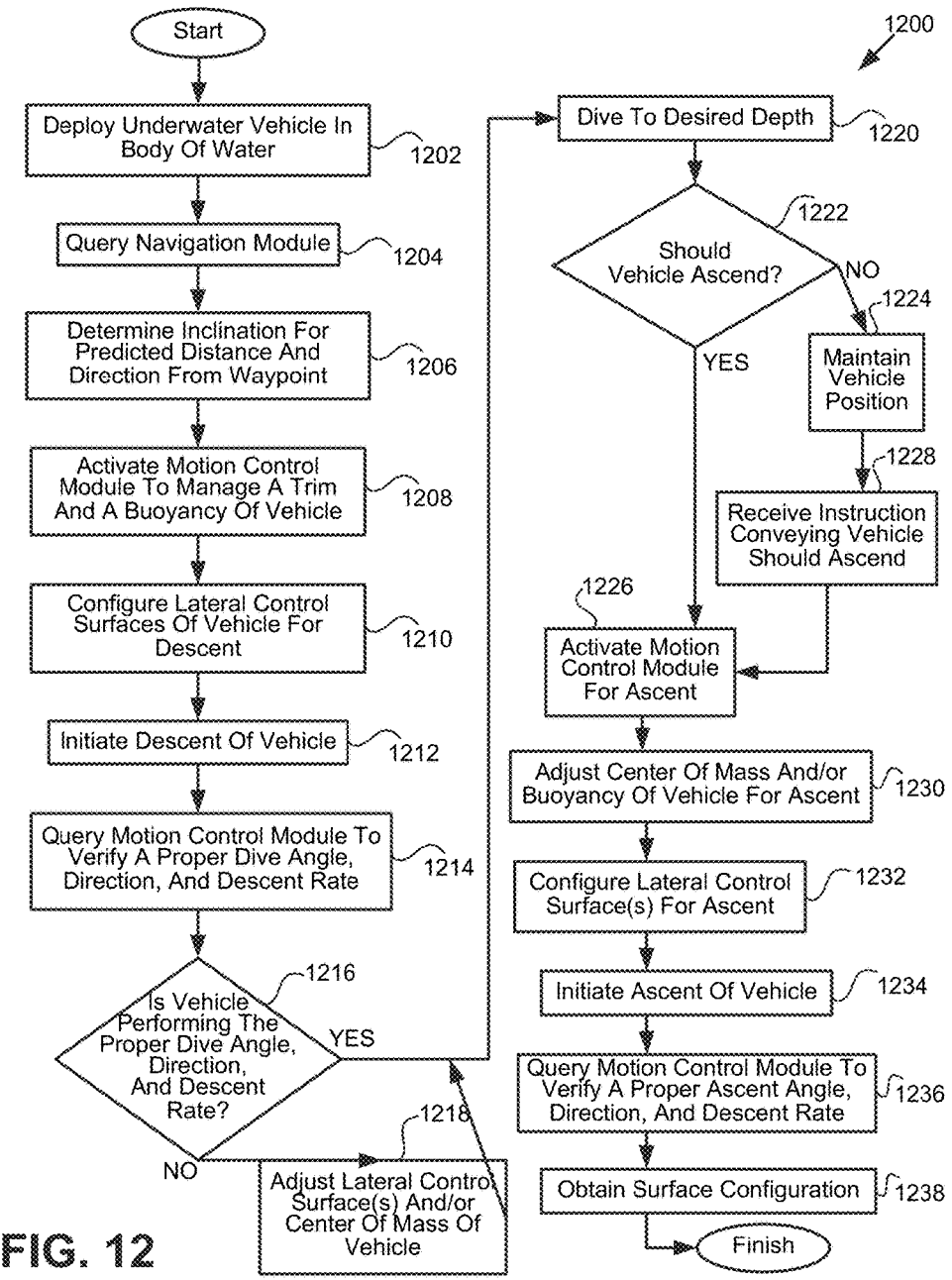
FIG. 12 illustrates a method for operating an underwater vehicle configured to perform vertical profiling and diagonal profiling, in accordance with one or more implementations.

FIG. 12 illustrates a method 1200 for operating an underwater vehicle configured to perform vertical profiling and diagonal profiling, in accordance with one or more implementations. The operations of method 1200 presented below are intended to be illustrative. In some embodiments, method 1200 may be accomplished with one or more additional operations not described, and/or without one or more of the operations discussed. Additionally, the order in which the operations of method 1200 are illustrated in FIG. 12 and described below is not intended to be limiting.

In some embodiments, method 1200 may be implemented wholly or partially in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At an operation 1202, an underwater vehicle (e.g., vehicle 100) may be deployed in a body of water (e.g., ocean, lake, and/or other body of water). In some implementations, the vehicle may be deployed by plane or boat.

At an operation 1204, a navigation module (e.g., navigation module 106) associated with the vehicle may be queried to determine a heading, position, maximum operating depth, and/or other navigational information. Operation 1204 may be performed by one or more processors (e.g., processors(s) 214), according to some implementations.

At an operation 1206, an inclination for a predicted distance and direction from a waypoint may be determined. The predicted distance may be based on a maximum operating depth. Operation 1206 may be performed by one or more processors (e.g., processors(s) 214), according to some implementations.

At an operation 1208, a motion control module (e.g., motion control module 204) may be activated to manage a trim and a buoyancy of the vehicle. The trim may be managed by a trim control module (e.g., trim control module 208). The trim control module may determine a center of mass of the vehicle. The buoyancy may be managed by a buoyancy control module (e.g., buoyancy control module 210).

Figure 13:
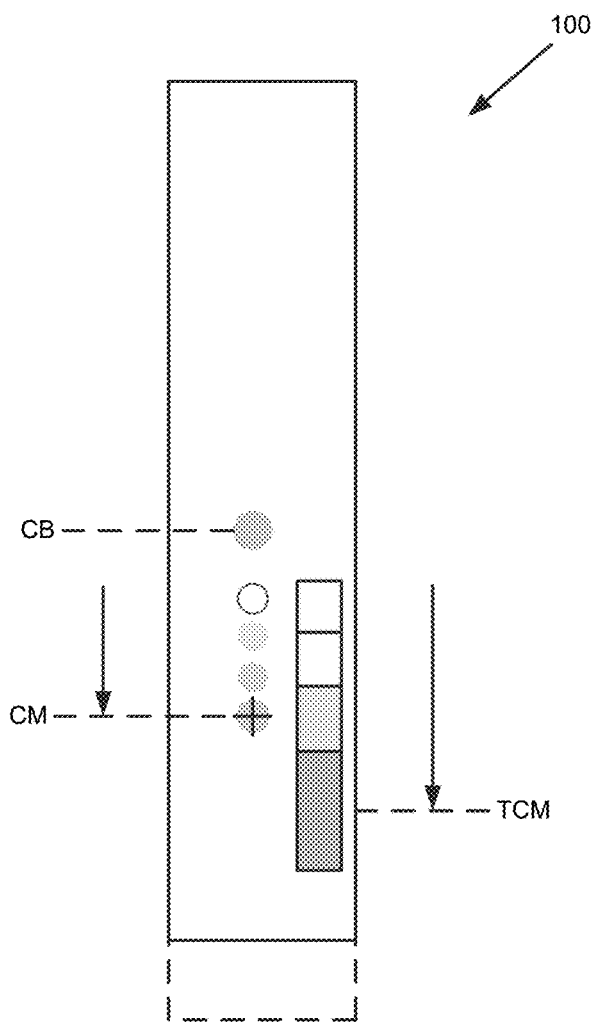
FIG. 13 illustrates controlling a trim of the vehicle, in accordance with one or more implementations.

FIG. 13 illustrates controlling a trim of vehicle 100, in accordance with one or more implementations. The trim control module 208 (TCM) may shift the center of mass (CM) lower and further form the center of buoyancy (CB) to increase stability.

FIGS. 14A, 14B, 14C, and 14D illustrate various spatial relationships between a center of mass of vehicle 100 and a center of buoyancy of vehicle 100, in accordance with one or more implementations. In FIG. 14A, the center of buoyancy moves upward as oil (or other fluid) is drawn in from a lower external bladder to the internal reservoir, changing the displacement volume of vehicle 100. In FIG. 14B, the center of mass also moves upward as the oil is moved from below the center of mass to above the center of mass. The effect on the position of the center of mass may be determined by distance and may be adjusted to match the amount of shift in the center of buoyancy. In FIG. 14C, oil is drawn into the internal reservoir to reduce buoyancy for descent. In FIG. 14D, oil is pushed out of the internal reservoir into the external bladder to increase buoyancy for ascent.

Figure 15A:
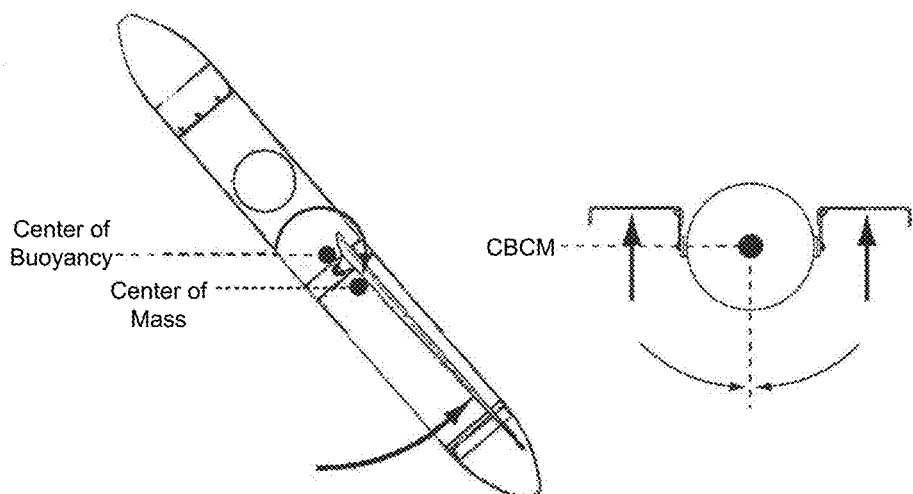
FIGS. 15A and 15B respectively illustrate spatial relationships between the center of mass of the vehicle and the center of buoyancy of the vehicle during descent and ascent, in accordance with one or more implementations.

FIG. 15A illustrates a spatial relationship between the center of mass of vehicle 100 and the center of buoyancy of vehicle 100 during descent, in accordance with one or more implementations. During descent, the center of mass located below the center of buoyancy may apply a rotational force about the center of buoyancy when vehicle 100 is not vertical. As vehicle 100 descends, water may push up against lateral control surfaces 104 causing rotational forces that counteract the rotational forces resulting from the spatial relationship between the center of mass of vehicle 100 and the center of buoyancy of vehicle 100. The center of buoyancy and the center of mass may be disposed along central longitudinal axis 106.

Referring again to FIG. 12, at an operation 1210, a lateral control surface module (e.g., lateral control surface module 206) within the vehicle may configure the vehicle for descent. Such a configuration may include moving one or more lateral control surfaces (e.g., lateral control surfaces 104).

At an operation 1212, a descent of the vehicle may be initiated.

At an operation 1214, the motion control module of the vehicle may be queried to verify a proper dive angle, direction, and descent rate. Operation 1214 may be performed by one or more processors (e.g., processors(s) 214), according to some implementations.

At an operation 1216, a determination may be made as to whether the vehicle is performing the proper dive angle, direction, and descent rate. If the determination in operation 1216 is negative, method 1200 may proceed to an operation 1218. If the determination in operation 1216 is positive, method 1200 may proceed to an operation 1220. Operation 1216 may be performed by one or more processors (e.g., processors(s) 214), according to some implementations.

At operation 1218, the motion control module may adjust one or more lateral control surfaces of the vehicle and/or the center of mass of the vehicle.

At operation 1220, the vehicle may dive to a desired depth.

Figure 16:
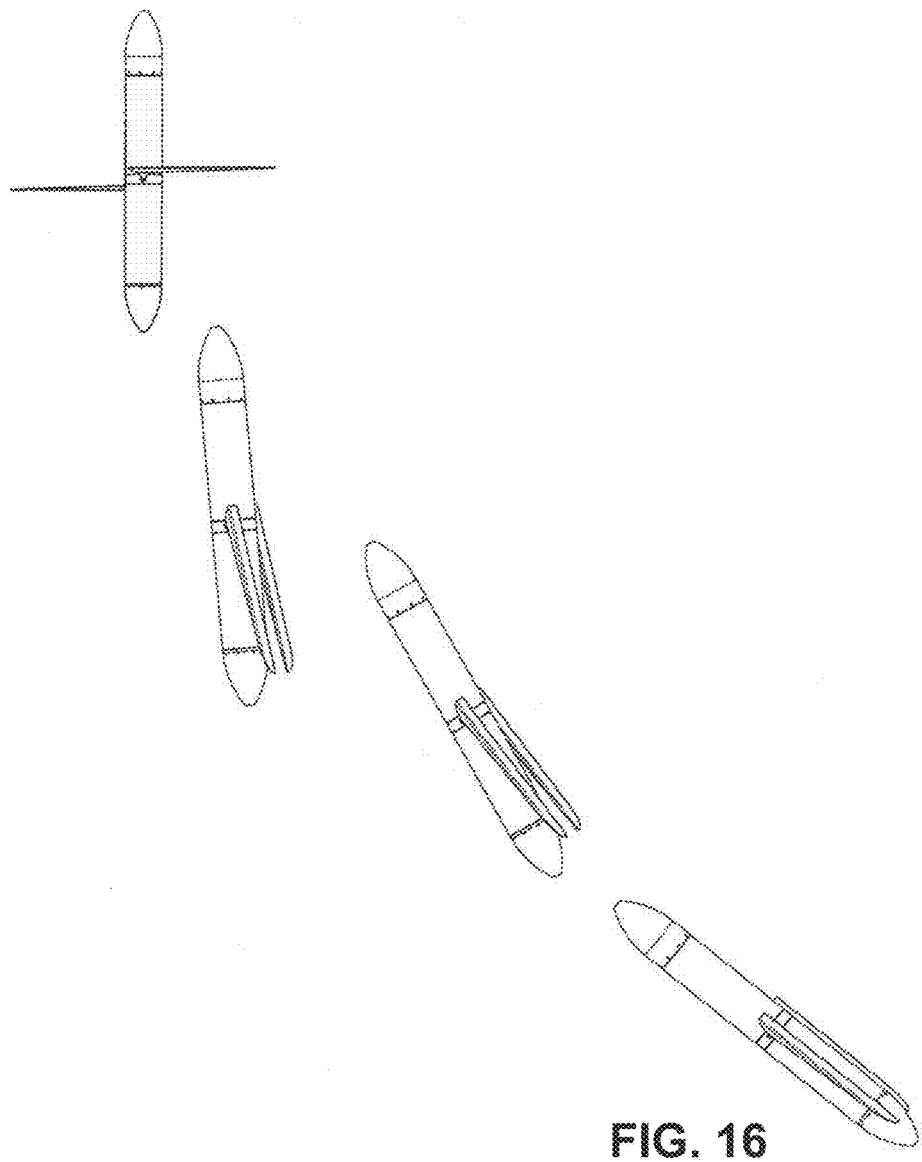
FIG. 16 illustrates a sequence of configurations of the vehicle during an initial phase of a diagonal descent, in accordance with one or more implementations.

FIG. 16 illustrates a sequence of configurations of vehicle 100 during an initial phase of a diagonal descent, in accordance with one or more implementations. Initially, vehicle 100 may be in a surface configuration. The lateral control surfaces may be rotated downward and buoyancy may become negative. The lateral control surfaces may be canted slightly from vertical and away from the central longitudinal axis. The vehicle may rotate until it reaches a desired glide angle. The glide angle may be determined based on a rate of descent. Once the desired glide angle is reached, the lateral control surfaces may be rotated to be approximately parallel to the central longitudinal axis of the vehicle.

Turning again to FIG. 12, at an operation 1222, a determination may be made as to whether the vehicle should ascend and/or activate profiling sensors. If the determination in operation 1222 is negative, method 200 may proceed to operation 1224. If the determination in operation 1222 is positive, method 200 may proceed to operation 1226. Operation 1222 may be performed by one or more processors (e.g., processor(s) 214), according to some implementations.

At operation 1224, the vehicle may maintain its position.

At an operation 1228, an instruction may be received conveying the vehicle should ascend. Operation 1228 may be performed by one or more processors (e.g., processors(s) 214), according to some implementations.

At operation 1226, the motion control module of the vehicle may be activated for ascent.

At an operation 1230, the center of mass of the vehicle and the buoyancy of the vehicle may be adjusted for ascent based on navigational information provided by the navigation module. The adjustments may be made by the trim control module and/or the buoyancy control module.

Figure 15B:
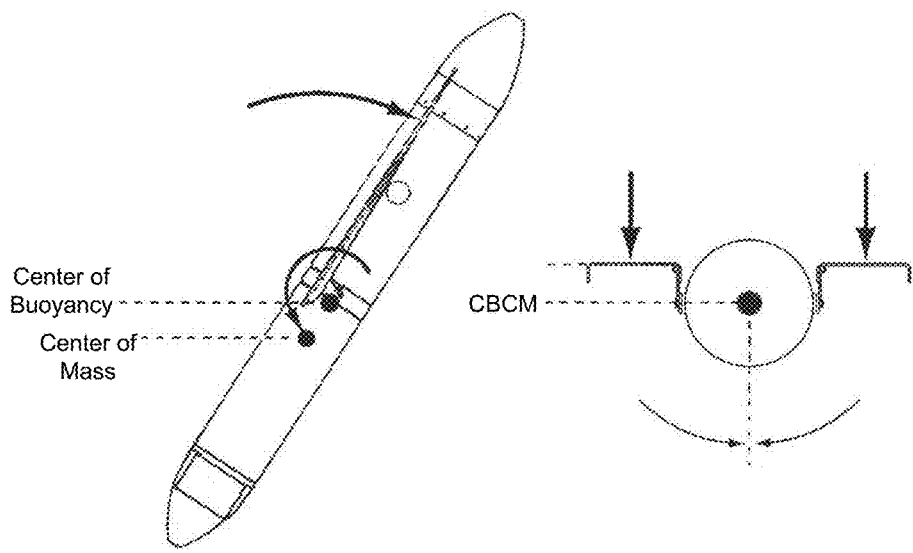

FIG. 15B illustrates a spatial relationship between the center of mass of the vehicle and the center of buoyancy of the vehicle during ascent, in accordance with one or more implementations. During ascent, the center of mass located below the center of buoyancy may apply a rotational force about the center of buoyancy when vehicle 100 is not vertical. As vehicle 100 ascends, water may push down against lateral control surfaces 104 causing rotational forces that counteract the rotational forces resulting from the spatial relationship between the center of mass of vehicle 100 and the center of buoyancy of vehicle 100. The center of buoyancy and the center of mass may be disposed along central longitudinal axis 106.

In FIG. 12, at an operation 1232, the lateral control surface module within the vehicle may configure the vehicle for ascent. Such a configuration may include moving one or more lateral control surfaces.

At an operation 1234, an ascent of the vehicle may be initiated.

At an operation 1236, the motion control module of the vehicle may be queried to verify a proper ascent angle, direction, and descent rate. Operation 1236 may be performed by one or more processors (e.g., processors(s) 214), according to some implementations.

Figure 17:
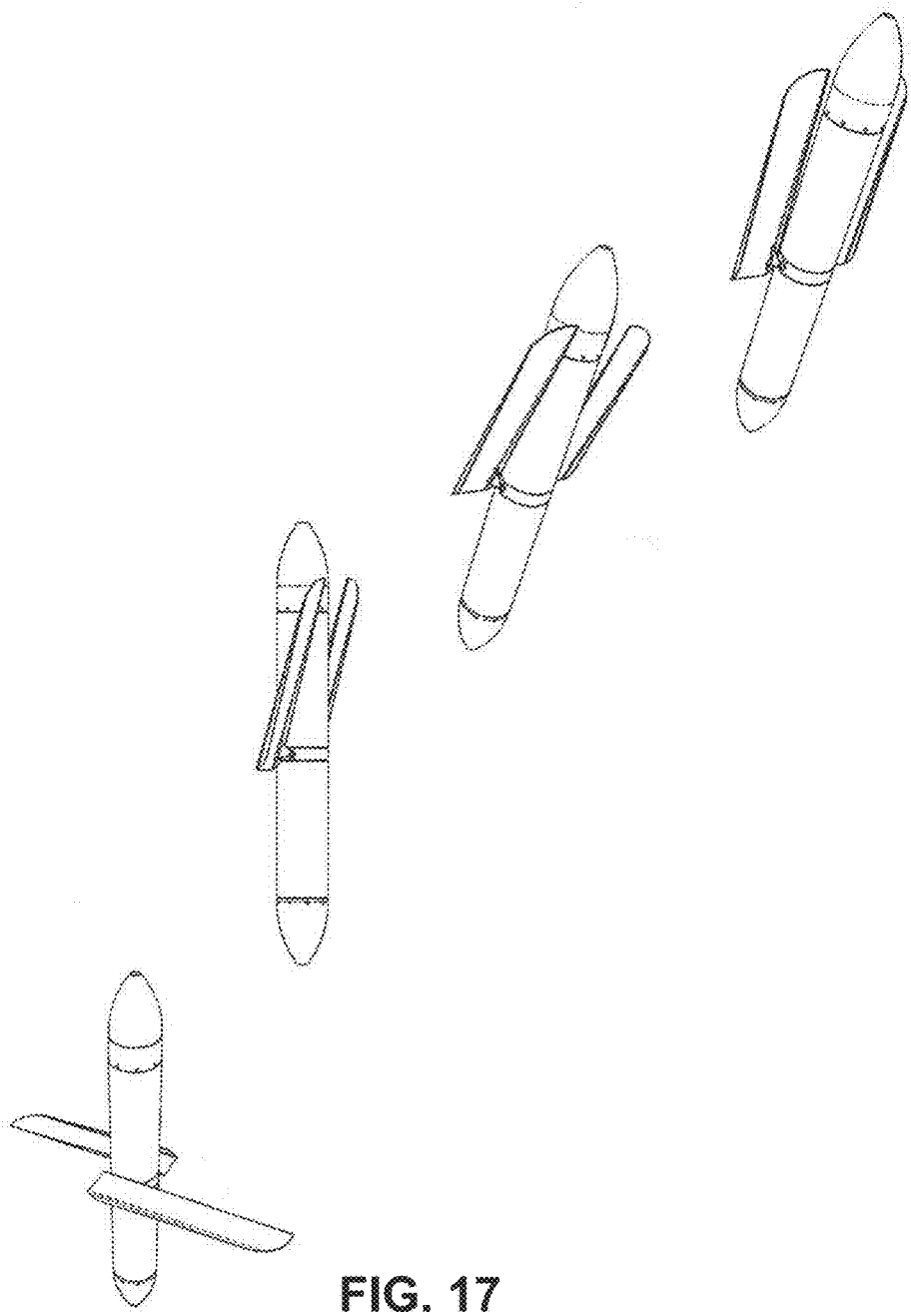
FIG. 17 illustrates a sequence of configurations of the vehicle during an initial phase of a diagonal ascent, in accordance with one or more implementations.

FIG. 17 illustrates a sequence of configurations of the vehicle during an initial phase of a diagonal ascent, in accordance with one or more implementations. The lateral control surfaces may be rotated upward and buoyancy may become positive. The lateral control surfaces may be canted slightly from vertical and away from the central longitudinal axis. The vehicle may rotate until it reaches a desired glide angle. The glide angle may be determined based on a rate of ascent. Once the desired glide angle is reached, the lateral control surfaces may be rotated to be approximately parallel to the central longitudinal axis of the vehicle.

Looking once more at FIG. 12, at an operation 1238, a surface configuration of the vehicle may be obtained (see, e.g., FIGS. 10A, 10B, 10C, and 10D).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An underwater vehicle configured to perform vertical motion in a body of water having a surface, the vehicle comprising:
   a body having an elongated shape with a central longitudinal axis, the body having an upper end on the central longitudinal axis and a lower end on the central longitudinal axis; and
   lateral control surfaces including a first control surface and a second control surface, the lateral control surfaces having a mechanical coupling with the body, wherein the lateral control surfaces are configured to rotate about a control axis in order to control an attitude of the vehicle during ascent or descent, and wherein the lateral control surfaces are further configured to position the lateral control surfaces horizontally and perpendicular to the central longitudinal axis of the vehicle at the surface of the body of water.

2. The vehicle of claim 1, wherein the upper end is positioned above the lower end during descent of the vehicle from a first depth underwater to a second depth underwater.

3. The vehicle of claim 1, wherein the body has a central lateral axis that is orthogonal to the central longitudinal axis, wherein the mechanical coupling of the lateral control surfaces is positioned at a position proximal to the central lateral axis, and wherein the control axis is parallel to the central lateral axis.

4. The vehicle of claim 1, wherein the lateral control surfaces are disposed outside of the body, and wherein a given one of the lateral control surfaces has a portion extend from the mechanical coupling in a direction perpendicular to the control axis.

5. The vehicle of claim 1, wherein the attitude is an inclination of one or both of the central longitudinal axis and the central lateral axis relative to one or more positional references.

6. The vehicle of claim 1, further comprising:
   a buoyancy control module configured to control vertical motion of the vehicle by affecting a buoyancy of the vehicle.

7. The vehicle of claim 4, wherein the first control surface and the second control surface are configured to rotate independently from each other about the control axis.

8. The vehicle of claim 5, wherein the one or more positional references include one or more of a surface of a body of water, a vertical line normal to a surface of a body of water, the four cardinal directions, or a direction of a current in a body of water.

9. The vehicle of claim 1, wherein the lateral control surfaces are further configured to control a rate of descent.

10. The vehicle of claim 1, wherein the vehicle further comprises a motion control module configured to control motions of the vehicle, the motions of the vehicle including one or more of an attitude of the vehicle, locomotion of the vehicle relative to one or more positional references, and a direction of locomotion of the vehicle.

11. The vehicle of claim 10, wherein the motion control module comprises a trim control module configured to control a position of a center of mass of the vehicle relative to a center of buoyancy of the vehicle.

12. The vehicle of claim 1, wherein the lateral control surfaces are movable into a spin configuration, the spin configuration being characterized by the working portions of the lateral control surfaces being disposed proximal to the same end of the vehicle with the first control surface and the second control surface being canted in equal amounts but in opposite directions.

13. A method for operating an underwater vehicle to perform vertical motion in a body of water having a surface, the vehicle having an elongated shape and a central longitudinal axis, the method comprising:
   rotating lateral control surfaces, the lateral control surfaces having a mechanical coupling with the vehicle that has an upper end and a lower end, the lateral control surfaces rotating about a control axis orthogonal to the central longitudinal axis in order to control an attitude of the vehicle during ascent or descent;
wherein the upper end is positioned above the lower end during ascent of the vehicle, and wherein the upper end is positioned above the lower end during descent of the vehicle, and wherein the method further comprises:
positioning the lateral control surfaces horizontally and perpendicular to the central longitudinal axis of the vehicle at the surface of the body of water.

14. The method of claim 13, wherein the lateral control surfaces are disposed outside of the body, the method further comprising extending a portion of a given one of the lateral control surfaces from the mechanical coupling in a direction perpendicular to the control axis.

15. The method of claim 13, wherein the attitude is an inclination of one or both of the central longitudinal axis or the central lateral axis relative to one or more positional references.

16. The method of claim 13, further comprising:
controlling vertical motion of the vehicle by affecting a buoyancy of the vehicle.

17. The method of claim 13, further comprising:
controlling motions of the vehicle, the motions of the vehicle including one or more of an attitude of the vehicle, locomotion of the vehicle relative to one or more positional references, and a direction of locomotion of the vehicle.

18. The method of claim 13, further comprising:
controlling a position of a center of mass of the vehicle relative to a center of buoyancy of the vehicle.

19. The method of claim 13, wherein the first control surface and the second control surface rotate independently from each other about the control axis.

* * * * *